United States Patent
Algieri et al.

(10) Patent No.: US 12,061,695 B2
(45) Date of Patent: Aug. 13, 2024

(54) UNAUTHORIZED DATA ENCRYPTION DETECTION

(71) Applicant: HEWLETT PACKARD ENTERPRISE DEVELOPMENT LP, Houston, TX (US)

(72) Inventors: Joseph E. Algieri, Santa Clara, CA (US); Alex Veprinsky, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 320 days.

(21) Appl. No.: 17/661,069

(22) Filed: Apr. 28, 2022

(65) Prior Publication Data

US 2023/0351015 A1    Nov. 2, 2023

(51) Int. Cl.
*G06F 21/55*    (2013.01)
*G06F 21/56*    (2013.01)

(52) U.S. Cl.
CPC .......... *G06F 21/554* (2013.01); *G06F 21/561* (2013.01); *G06F 2221/034* (2013.01)

(58) Field of Classification Search
CPC .................................................. G06F 21/554
See application file for complete search history.

(56) References Cited

U.S. PATENT DOCUMENTS

| | | |
|---|---|---|
| 10,346,610 B1 | 7/2019 | Natanzon |
| 10,609,066 B1 | 3/2020 | Nossik et al. |
| 11,030,314 B2 | 6/2021 | Kucherov et al. |
| 2019/0108340 A1 | 4/2019 | Bedhapudi et al. |
| 2019/0108341 A1 | 4/2019 | Bedhapudi et al. |
| 2019/0109870 A1 | 4/2019 | Bedhapudi et al. |
| 2019/0332766 A1* | 10/2019 | Guri ...................... G06F 21/565 |
| 2020/0186542 A1 | 6/2020 | Strogov et al. |
| 2020/0204589 A1* | 6/2020 | Strogov ............. H04L 63/1416 |
| 2020/0250305 A1 | 8/2020 | Pendyala et al. |
| 2020/0250306 A1 | 8/2020 | Pendyala et al. |
| 2020/0250307 A1 | 8/2020 | Pendyala et al. |
| 2021/0312046 A1* | 10/2021 | Hicks .................... G06F 21/566 |
| 2022/0292194 A1* | 9/2022 | Edwards ................. G06F 9/485 |

OTHER PUBLICATIONS

Netapp, "The NetApp solution for ransomware", Technical Report, TR-4572, Mar. 2022, 13 pages.
Saran, Vikashini, "Honey Pots", Facebook.com, available online at <https://pt-br.facebook.com/CCIEEE/posts/299473453469481>, May 15, 2012, 2 pages.
Sunny Valley Networks, "What are Honeypots (Computing)?", available online at <https://www.sunnyvalley.io/docs/network-security-tutorials/what-are-honeypots>, Feb. 2022, 5 pages.

* cited by examiner

*Primary Examiner* — Bradley W Holder
(74) *Attorney, Agent, or Firm* — Trop, Pruner & Hu, P.C.

(57) ABSTRACT

In some examples, a storage system creates a first copy of a data volume, and receives write requests having a specified characteristic from a host system, the write requests to write data of the data volume, where the storage system is to reject the write requests having the specified characteristic and to accept write requests without the specified characteristic. The storage system maintains metadata for the first copy of the data volume, the metadata indicating blocks of the data volume that have changed since the first copy of the data volume was created. The storage system determines, using the metadata, whether an unauthorized data encryption of the data of the data volume has occurred.

18 Claims, 5 Drawing Sheets

UNAUTHORIZED DATA ENCRYPTION DETECTION

BACKGROUND

A ransomware attack involves encrypting data on a computer or on multiple computers. In a ransomware attack, data can be encrypted using an encryption key, which renders the data inaccessible by users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
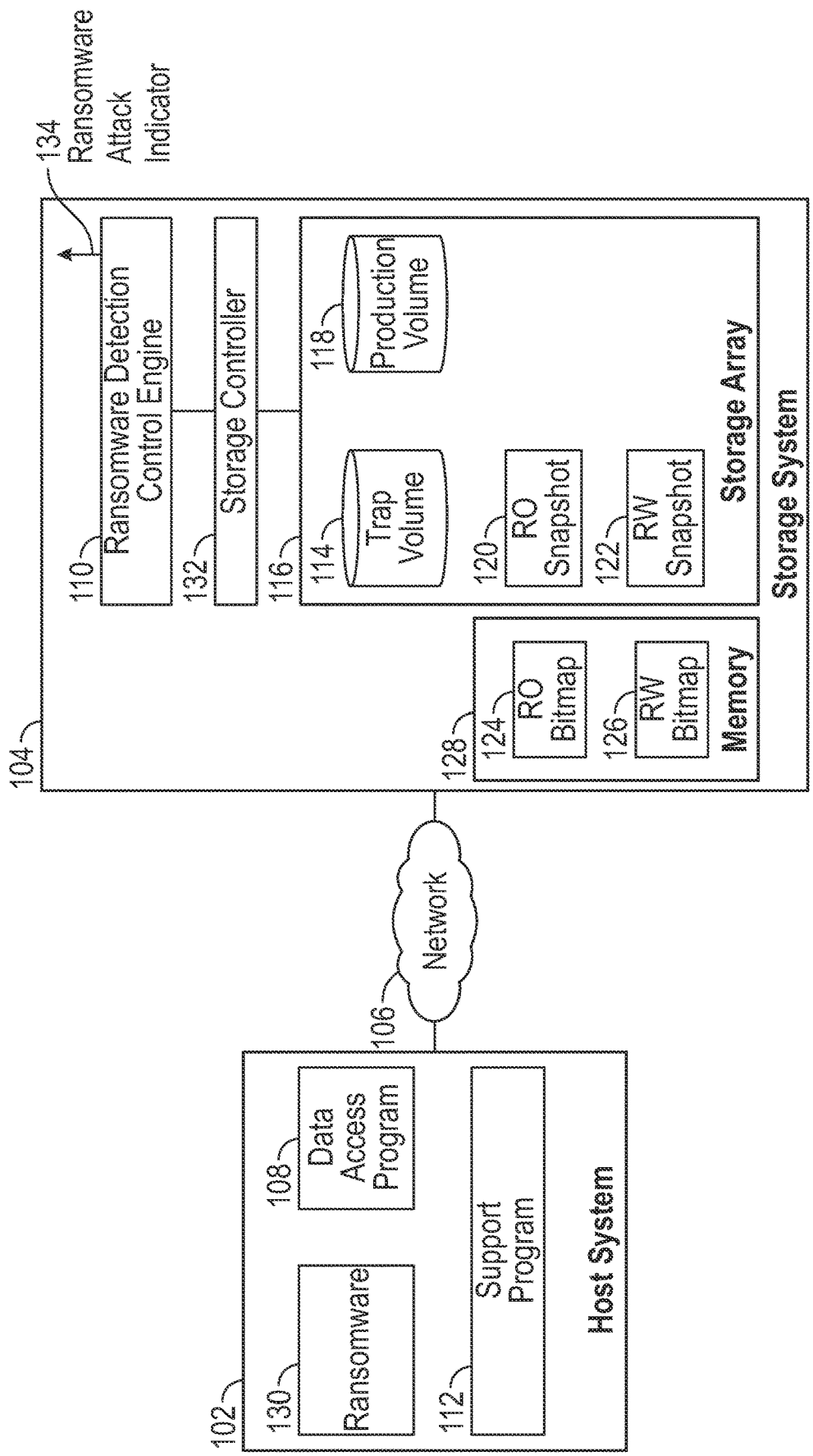
FIG. 1 is a block diagram of an arrangement that includes a host system and a storage system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A ransomware attack can be difficult to detect. By the time an enterprise becomes aware of the attack, most or all of the data has been encrypted and thus inaccessible. A ransomware attack can be difficult to detect because normal computer operations may also encrypt data that is being stored to a storage system, so that distinguishing between authorized and unauthorized encryption of data can be challenging. When normal computer operations encrypt data, a ransomware detection technique that merely checks for encrypted data in input/output (I/O) operations with the storage system would not be effective since authorized I/O operations would contain encrypted data.

Enterprises may attempt to protect themselves from ransomware attacks by backing up their data to backup storage systems. However, ransomware attacks often first attack a backup storage system to encrypt data on the backup storage system or, alternatively, delete the backup data, before encrypting data on computer(s), so that both data in the backup storage system and on the computer(s) become inaccessible.

Although reference is made to ransomware attacks in some examples, it is noted that there may be other sources of unauthorized data encryption in other examples, either caused by malware or other unauthorized entities (humans, programs, or machines). An "unauthorized data encryption" refers to a data encryption in which data has been encrypted by any entity that is not allowed to or is not supposed to perform the encryption.

In accordance with some implementations of the present disclosure, ransomware detection is based on use of metadata of a snapshot of a specified data volume and use of a storage program that rejects write requests having a specified characteristic while allowing write requests without the specified characteristic. In some examples, a read-only snapshot of a data volume is created, and in some cases, a read-write snapshot of the data volume is created. Tracking metadata is maintained for the read-only snapshot. If the read-write snapshot is created, then tracking metadata is also maintained for the read-write snapshot. An unauthorized data encryption of data of the data volume is detected based on use of the tracking metadata for the read-only snapshot or based on the tracking metadata for the read-only snapshot and the read-write snapshot. Using ransomware detection techniques/mechanisms according to some examples of the present disclosure, more reliable and timely detection of a ransomware attack can be achieved.

FIG. 1 is a block diagram of an example arrangement that includes a host system 102 and a storage system 104. The host system 102 can include a computer system, such as a server computer, or another type of computer system. As used here, a "host system" can refer to any computer system that is able to submit input/output (I/O) requests to perform data access of data stored in the storage system 104. A data access can refer to a read access or a write access.

There may be more than one host system 102 that is able to access the storage system 104.

A "storage system" can refer to any computing infrastructure that includes a storage medium and associated control logic to store data.

In examples according to FIG. 1, the host system 102 is coupled over a network 106 to the storage system 104. The network 106 can include a local area network (LAN), a storage unit area network (SAN), a public network such as the Internet, or any other type of network. The host system 102 includes a data access program 108 (e.g., an application program, an operating system (OS), a utility program, and so forth) that can issue I/O requests to the storage system 104. A "program" can include machine-readable instructions that can execute on a hardware processor (or multiple hardware processors).

A hardware processor can include a microprocessor, a core of a multi-core microprocessor, a microcontroller, a programmable integrated circuit, a programmable gate array, or another hardware processing circuit.

In some examples, the data access program 108 can encrypt data that is to be written to the storage system 104. Thus, the storage system 104 stores encrypted data in response to write requests from the data access program 108. Data encryption performed by the data access program 108 is considered an authorized data encryption.

Although not shown, the data access program 108 can issue I/O requests to the storage system 104 in response to requests received from client devices coupled to the host system 102. There may be multiple data access programs that are able to perform authorized data encryption of data written to the storage system 104.

In examples according to FIG. 1, detection of a ransomware attack (or more generally, detection of unauthorized data encryption) is based on use of the following components: (1) a support program 112 in the host system 102 to assist in ransomware detection in the storage system 104, (2) a ransomware detection control engine 110 in the storage system 104, and (3) snapshots created based on a trap volume 114.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

As used here, a "data volume" refers to a collection of data that is stored in a storage array 116 of the storage system 104. The data volume can be a logical data volume stored on the physical storage device(s) of the storage array 116. A "storage array" can refer to a collection of storage devices, where a "collection of storage devices" can include a single storage device or multiple storage devices. A storage device can be implemented using any or some combination of the following: a disk-based storage device, a solid-state drive, a memory device, and so forth.

In FIG. 1, a production volume 118 and the trap volume 114 are examples of data volumes stored in the storage array 116. Note that there may be more than one production volume 118 and/or more than one trap volume 114 in other examples.

A "trap volume" can refer to a data volume that is not used to store normal data (production data) associated with I/O requests (read and write requests) from authorized requesters, including users, programs (e.g., the data access program 108), and/or machines. On the other hand, a "production volume" stores normal data (production data) associated with I/O requests from authorized requesters.

The trap volume 114 stores "dummy" data, which is data that is not used by authorized requesters. The dummy data can include a specified pattern, such as a random pattern or any other designated pattern of data.

An "authorized requester" can refer to any requester that has been designated by an administrator or another entity as being authorized to perform I/O operations with respect to the storage system 104.

In examples according to FIG. 1, the storage system 104 can create the trap volume 114 and take two snapshots of the trap volume 114, including a read-only (RO) snapshot 120 and a read-write (RW) snapshot 122. A "snapshot" of a data volume refers to a point-in-time copy of the data in the data volume. The snapshot represents a copy of the data volume at a given point in time, i.e., at the time that the snapshot was created. The creation of the trap volume 114 and the snapshots may be requested by the host system 102 or by another entity, whether inside the storage system 104 or external of the storage system 104.

A "read-only snapshot" is a snapshot that is not subject to being modified by write accesses after the read-only snapshot has been created. A "read-write snapshot" is a snapshot that can be modified by writes to the read-write snapshot.

The read-only snapshot 120 and the read-write snapshot 122 can be stored in the storage array 116 of the storage system 104.

In further examples, a read-only snapshot and a read-write snapshot can be created for a production volume (e.g., 118) that may store encrypted data. In such further examples, ransomware detection can be based on metadata associated with the read-only snapshot and the read-write snapshot for the production volume.

Although FIG. 1 depicts a ransomware detection mechanism that relies on use of both the read-only snapshot 120 and the read-write snapshot 122, other examples can omit use of the read-write snapshot 122 (discussed further below).

Each of the read-only snapshot 120 and the read-write snapshot 122 is associated with corresponding tracking metadata that indicates blocks of data that have changed between the snapshot and the underlying trap volume 114. In some examples, the tracking metadata is in the form of a bitmap, including an RO bitmap 124 associated with the read-only snapshot 120, and an RW bitmap 126 associated with the read-write snapshot 122.

A "bitmap" refers to an arrangement of bits, e.g., an array of bits, that correspond to respective data blocks of the trap volume 114. A "data block" can refer to any segment of data in a data volume.

The trap volume 114 is divided into multiple data blocks, where each data block has a specified size to contain a corresponding data segment. Each bit of the bitmap can be set to a first value (e.g., 0 or 1) or a second value (e.g., 1 or 0) that is different from the first value. The bit when set to the first value indicates that an associated data block has not changed between the trap volume 114 and the snapshot, and the bit set to the second value indicates that the data block has changed between the trap volume 114 and the snapshot since the snapshot was taken.

In the case of the read-only snapshot 120, a bit in the RO bitmap 124 set to the second value indicates that a write has occurred to the corresponding data block in the trap volume 114 that changed the content of the corresponding data block in the trap volume 114. For the read-write snapshot 122, a bit in the RW bitmap 126 is set to the second value in response to either of the following two events: (1) a write has occurred to the corresponding data block in the trap volume 114, or (2) a write has changed the content of the corresponding data block in the read-write snapshot 122. Stated differently, a write to a given data block in the trap volume 114 results in the respective bit in the RO bitmap 124 being set to the second value, and also results in the respective bit in the RW bitmap 126 being set to the second value. However, a write to a given data block in the read-write snapshot 122 results in the respective bit in the RW bitmap 126 being set to the second value, but does not change the respective bit in the RO bitmap 124.

The RO bitmap 124 and the RW bitmap 126 can be stored in a memory 128 of the storage system 104. A memory can be implemented with a collection of memory devices (a single memory device or multiple memory devices). A memory device can include any or some combination of the following: a dynamic random access (DRAM) memory device, a static random access memory (SRAM) device, a flash memory device, and so forth.

Although FIG. 1 shows the RO bitmap 124 and the RW bitmap 126 being stored in the memory 128 of the storage system 104, in other examples, the RO bitmap 124 and the RW bitmap 126 can be stored in the storage array 116.

More generally, a tracking metadata includes indicators for indicating blocks of data that have changed between the snapshot and the underlying trap volume 114. The indicators can be set to different values to indicate whether or not data blocks have been changed.

In examples according to FIG. 1, the support program 112 can issue I/O requests to read data of the read-write snapshot 122 and to write data to the read-write snapshot 122.

The support program 112 can issue I/O requests to the read-write snapshot 122 to simulate I/O activity with respect to the read-write snapshot 122. As a result, a ransomware 130 that may have infected the host system 102 may observe I/O accesses of the read-write snapshot 122, and can thus identify the read-write snapshot 122 as a target for encryption by the ransomware 130.

The ransomware detection control engine 110 in the storage system 104 receives I/O requests from the support program 112. If the I/O requests are read requests, the ransomware detection control engine 110 allows the read requests to proceed to a storage controller 132 of the storage system 104 to retrieve the requested data from the read-write snapshot 122. The storage controller 132 then returns read data from the read-write snapshot 122 to the support program 112.

However, write requests from the support program 112 to write data to the read-write snapshot 122 are rejected by the ransomware detection control engine 110, which prevents the write requests from being processed by the storage controller 132. However, the ransomware detection control engine 110 or the storage controller 132 can send write success acknowledgments of the write requests even though they have been rejected. In other examples, the success acknowledgments are not sent.

The storage controller 132 can be implemented with a hardware processing circuit, or machine-readable instructions executable by the hardware processing circuit. The ransomware detection control engine 110 can be part of the storage controller 132 or can be separate from the storage controller 132.

Write requests from the support program 112 can have a specified characteristic that indicates to the ransomware detection control engine 110 that the write requests are to be rejected and not processed with respect to the read-write snapshot 122. The specified characteristic of a write request can include any or some combination of the following: an indicator that indicates the source of the write request as being the support program 112 (e.g., the indicator can include an identifier of the support program 112); write data of the write request can have a specified pattern (or one of multiple specified patterns) that when detected by the ransomware detection control engine 110 indicates to the ransomware detection control engine 110 that the write request is to be rejected; the write request has a target address or another target storage location information (or one of multiple specified addresses or other storage location information) that indicates to the ransomware detection control engine 110 that the write request is to be rejected; or any other specified characteristic.

The ransomware detection control engine 110 allows any write request without the specified characteristic (e.g., write request indicating that the write request is from a source other than the support program 112) to be processed by the storage controller 132 with respect to the read-write snapshot 122, to allow a write of data to the read-write snapshot 122. For example, a write request from the ransomware 130 would not have the specified characteristic, and as a result, the ransomware detection control engine 110 allows the write request from the ransomware 130 to be processed by the storage controller 132 to write data from the ransomware 130 to the read-write snapshot 122. The data from the ransomware 130 is likely to include encrypted data.

As data blocks are modified in the read-write snapshot 122 in response to write requests from the ransomware 130, the RW bitmap 126 associated with the read-write snapshot 122 is modified by setting bits associated with the modified data blocks to the second value. The bits of the RW bitmap 126 for any data blocks of the read-write snapshot 122 that have not yet been modified remain at the first value.

Note that in some examples according to FIG. 1, I/O operations are not performed with respect to the trap volume 114 after the trap volume 114 is created and populated with specified data. Since writes do not occur to the trap volume 114, the RO bitmap 124 for the read-only snapshot 120 does not change. Note that the RO bitmap 124 for the read-only snapshot 120 does not change in response to writes by the ransomware 130 to the read-write snapshot 122. As a result, the bits of the RO bitmap 124 remain at the first value to indicate no data blocks of the trap volume 114 have changed.

In other examples, a read-only snapshot and a read-write snapshot can be created for a production volume that may be the subject of writes from legitimate sources such as the data access program 108. In such examples, writes to the production volume would cause both the RO bitmap for the read-only snapshot and the RW bitmap for the read-write snapshot to change. But any write of data by the ransomware 130 to the read-write snapshot would cause a deviation between the RO bitmap and the RW bitmap as the write to the read-write snapshot would cause the RW bitmap to change but not the RO bitmap.

The ransomware detection control engine 110 can compare the RO bitmap 124 to the RW bitmap 126. In some examples, this comparison can be done on a periodic basis (based on a timer expiring), or in response to any other event, such as in response to an indication (e.g., a message, an information element, a signal, etc.) that a write has been allowed to the read-write snapshot 122.

If the ransomware detection control engine 110 detects a difference between the RO bitmap 124 and the RW bitmap 126, then the ransomware detection control engine 110 can determine that a ransomware attack has occurred. In response, the ransomware detection control engine 110 can issue a ransomware attack indicator 134. The ransomware attack indicator 134 can be in the form of a message, an information element, a signal, or any other type of indicator.

The ransomware attack indicator 134 can be sent to a target entity in the host system 102, such as an intrusion management engine, an OS, a firmware, and so forth. Alternatively, the ransomware attack indicator 134 can be sent by the ransomware detection control engine 110 to a target entity that is remote from the host system 102, such as an administrator, a program, or a machine. The target entity in the host system 102 or the remote target entity can take action to remediate against the ransomware attack, such as by shutting down the host system 102 and/or the storage system 104, or otherwise preventing any further writes from occurring to the storage system 104.

Figure 2A:
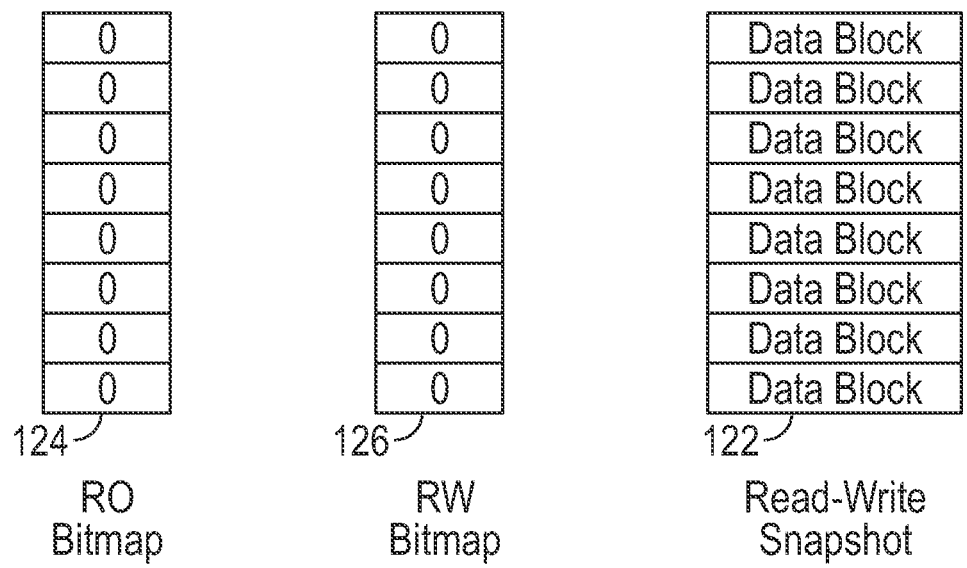
FIGS. 2A-2B illustrate states of bitmaps and a read-write snapshot of a trap volume, according to some examples.

FIG. 2A shows an example of the states of the RO bitmap 124 and the RW bitmap 126 at a time that the read-only snapshot 120 and the read-write snapshot 122 were initially taken. FIG. 2A shows a simple example in which it is assumed that the read-write snapshot 122 (and similarly, the trap volume 114) has 8 data blocks. Each of the RO bitmap 124 and the RW bitmap 126 includes 8 bits. The read-write snapshot 122 may include a lot more data blocks in other examples (e.g., thousands or millions of data blocks), and as a result, each of the RO bitmap 124 and the RW bitmap 126 would include a corresponding larger number of bits.

Initially, at the time that the read-only snapshot 120 (as shown in FIG. 1) and the read-write snapshot 122 were taken, the bits of each of the RO bitmap 124 and RW bitmap 126 are set to the first value (e.g., 0) to indicate that no modification has occurred to any data block. A bit of the RO bitmap 124 set to 0 indicates that no modification has occurred to the corresponding data block of the trap volume 114, and a bit of the RW bitmap 126 set to 0 indicates that no modification has occurred to the corresponding data block of the trap volume 114 or the read-write snapshot 122.

Figure 2B:
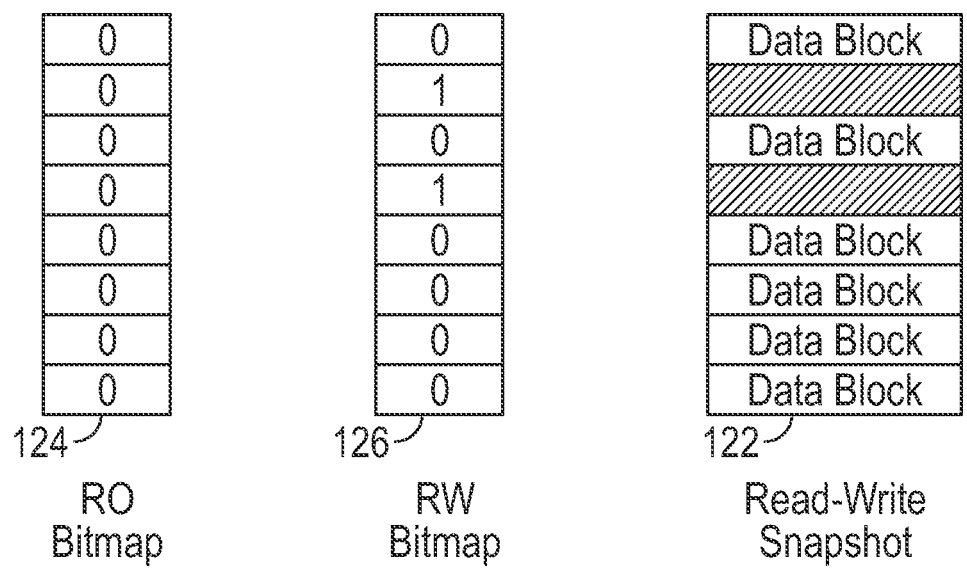

FIG. 2B shows the states of the RO bitmap 124 and of the RW bitmap 126 after a number of writes (e.g., performed by the ransomware 130 of FIG. 1) have occurred with respect to the read-write snapshot 122. It is assumed that no data block in the trap volume 114 has been modified, such that the RO bitmap 124 remains unchanged (e.g., all of its bits are set to 0). However, a number of writes have occurred to change the content of certain data blocks in the read-write snapshot 122 (shaded in FIG. 2B), which causes a corresponding number of bits of the RW bitmap 126 to change from the 0 to 1.

Thus, in the states depicted in FIG. 2B, the content of the RO bitmap 124 differs from the content of the RW bitmap 126, which can be detected by the ransomware detection control engine 110 to indicate that a ransomware attack has occurred.

The comparison of the RO bitmap 124 and the RW bitmap 126 is a bit-wise comparison that can be performed by the ransomware detection control engine 110 relatively efficiently and quickly. Note that any difference between the RO bitmap 124 and the RW bitmap 126 (even a difference of one bit) can be an indication of a ransomware attack, so that the ransomware detection control engine 110 can detect the ransomware attack relatively early.

More generally, the ransomware detection control engine 110 can indicate that a ransomware attack has occurred in response to detecting N or more (N=1, 2, 3, 10, 20, 50, etc.) bits differ between the RO bitmap 124 and the RW bitmap 126.

Although FIGS. 2A-2B show an example where the RO bitmap 124 remains in its initial state with all 0s, in other examples, the RO bitmap 124 and the RW bitmap 126 may be for a read-only snapshot and a read-write snapshot, respectively, of a production volume which may be actively written to. In such examples, as the production volume is written to, the corresponding bits of the RO bitmap 124 and the RW bitmap 126 would change in the same way. So long as no writes have occurred to the read-write snapshot, the content of the RO bitmap 124 and the RW bitmap 126 remains the same. However, if writes occurred to the read-write snapshot, then the content of the RO bitmap 124 and the RW bitmap 126 would deviate, and that would indicate to the ransomware detection control engine 110 that a ransomware attack has occurred.

In further examples, the read-write snapshot 122 is not employed. Rather, just the read-only snapshot 120 and the corresponding RO bitmap 124 (or more generally, a tracking metadata for the read-only snapshot 120) are used.

Figure 3A:
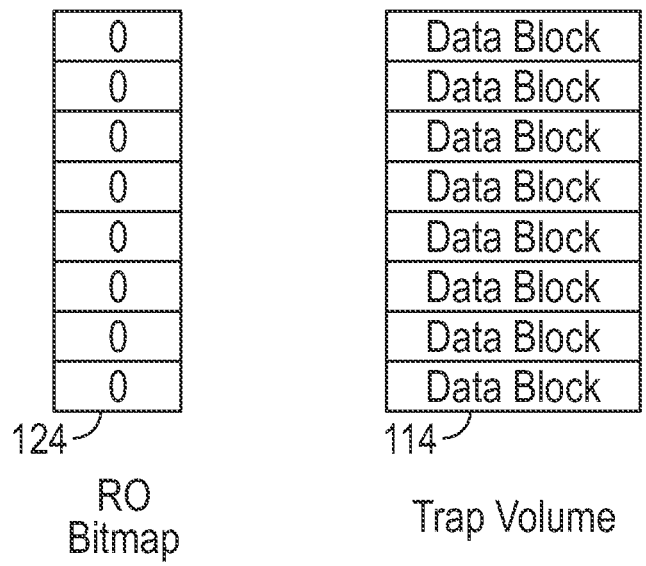
FIGS. 3A-3B illustrate states of a bitmap and a trap volume, according to further examples.
Figure 3B:
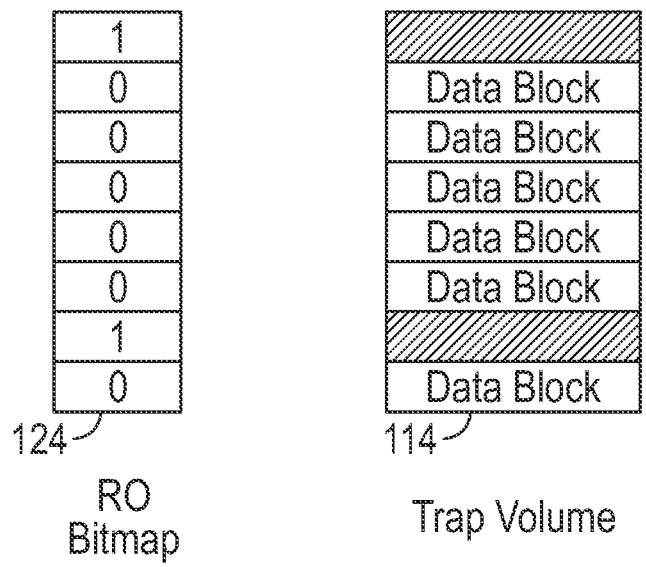

FIGS. 3A-3B show an example of ransomware attack detection performed by the ransomware detection control engine 110 in examples where the read-only snapshot 120 is used but the read-write snapshot 122 is not used.

FIG. 3A shows a state of the RO bitmap 124 when the read-only snapshot 120 was initially taken. The bits of the RO bitmap 124 are all initially set to 0, since the data blocks of the trap volume 114 have not yet been modified.

In examples according to FIGS. 3A-3B, the support program 112 can issue I/O requests to the trap volume 114, to read data of the trap volume 114 and to attempt to write data to the trap volume 114. If the I/O requests are read requests, the ransomware detection control engine 110 in the storage system 104 allows the read requests to proceed to the storage controller 132, which returns read data from the trap volume 114 to the support program 112.

However, write requests from the support program 112 to write data to the trap volume 114 are rejected by the ransomware detection control engine 110, which prevents the write requests from being processed by the storage controller 132. However, the ransomware detection control engine 110 or the storage controller 132 can send write success acknowledgments of the write requests even though the write requests have been rejected.

Write requests from the support program 112 can have a specified characteristic (e.g., the source of the write requests is the support program 112) that indicates to the ransomware detection control engine 110 that the write requests are to be rejected and not processed with respect to the trap volume 114.

The ransomware detection control engine 110 allows any write request without the specified characteristic to be processed by the storage controller 132 with respect to the trap volume 114, to allow a write update of the trap volume 114. For example, write requests from the ransomware 130 would not have the specified characteristic, and as a result, the ransomware detection control engine 110 allows the write requests from the ransomware 130 to be processed by the storage controller 132 to write data from the ransomware 130 to the trap volume 114. The data from the ransomware 130 written to the trap volume 114 is likely to include encrypted data.

As data blocks are modified in the trap volume 114 in response to write requests from the ransomware 130, which are indicated by shaded blocks in FIG. 3B, the corresponding bits of the RO bitmap 124 are changed from the 0 to 1.

The ransomware detection control engine 110 can monitor the RO bitmap 124, such as on a periodic basis or in response to any other event. If the ransomware detection control engine 110 detects any change in the RO bitmap 124, then the ransomware detection control engine 110 can determine that a ransomware attack has occurred, and can issue the ransomware attack indicator 134. More generally, the ransomware detection control engine 110 can indicate a ransomware attack in response to detecting that N bits of the RO bitmap 124 have changed.

Figure 4:
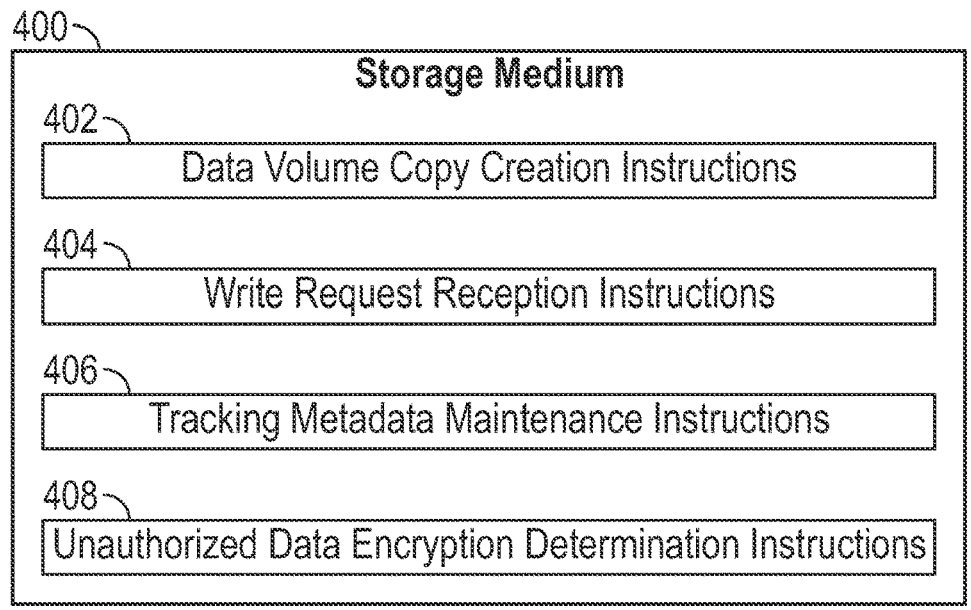
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a storage system (e.g., 104 in FIG. 1) to perform various tasks.

The machine-readable instructions include data volume copy creation instructions 402 to create a first copy of a data volume (e.g., the read-only snapshot 120 of the trap volume 114 in FIG. 1).

The machine-readable instructions include write request reception instructions 404 to receive, at the storage system, write requests having a specified characteristic from a host system, the write requests to write data of the data volume (write to the data volume or to a read-write snapshot of the data volume). The storage system is to reject the write requests having the specified characteristic and to accept write requests without the specified characteristic.

The machine-readable instructions include tracking metadata maintenance instructions 406 to maintain metadata (e.g., the RO bitmap 124 of FIG. 1) for the first copy of the data volume. The metadata indicates blocks of the data volume that have changed since the first copy of the data volume was created.

The machine-readable instructions include unauthorized data encryption determination instructions 408 to determine, using the metadata, whether an unauthorized data encryption of the data of the data volume has occurred.

In some examples, the machine-readable instructions send success acknowledgments of the write requests having the specified characteristic even though the write requests having the specified characteristic were rejected by the storage system.

In some examples, the metadata is first metadata for a read-only snapshot and the write requests having the specified characteristic are to a read-write snapshot of the data volume. The machine-readable instructions maintain second metadata for the read-write snapshot, and determine whether the unauthorized data encryption has occurred based on comparing the first metadata and the second metadata.

In some examples, the machine-readable instructions determine that the unauthorized data encryption has occurred in response to detecting that the first metadata does not match the second metadata.

In some examples, the first copy of the data volume is a read-only snapshot of the data volume, and the write requests are to the data volume. The machine-readable instructions determine whether the unauthorized data encryption has occurred based on detecting whether the metadata for the read-only snapshot has changed.

Figure 5:
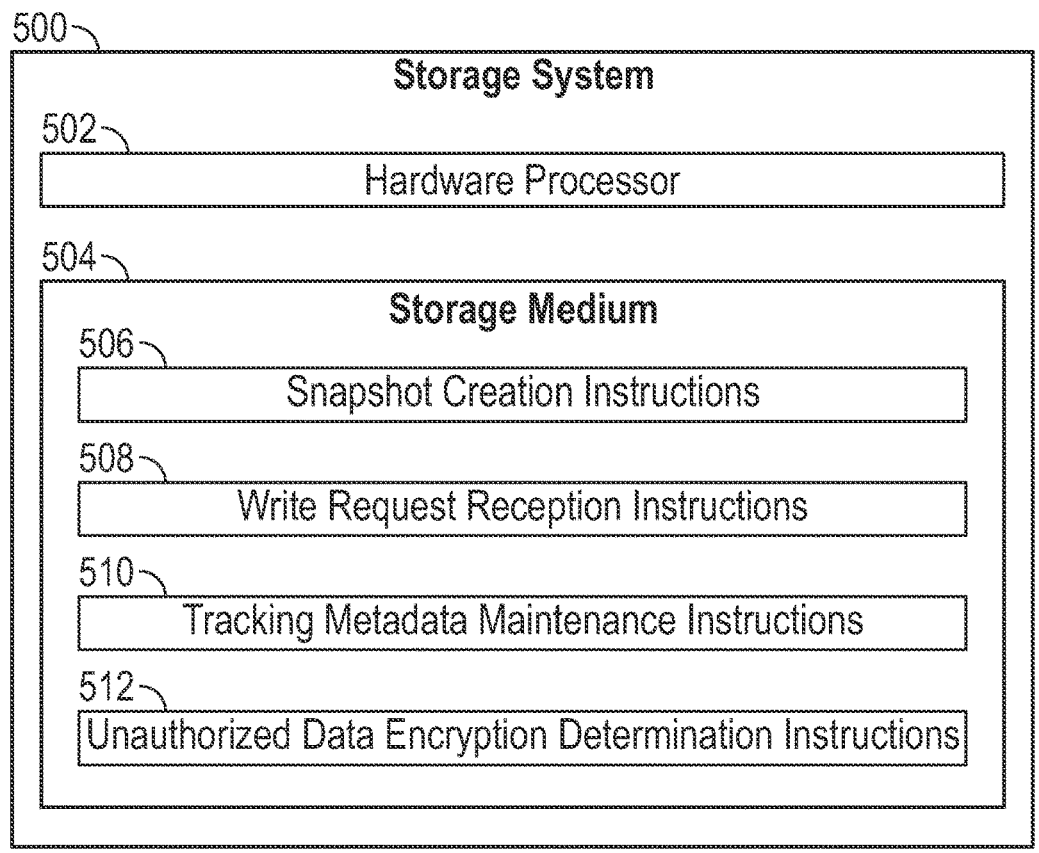
FIG. 5 is a block diagram of a storage system according to some examples.

FIG. 5 is a block diagram of a storage system 500 that includes a hardware processor 502 (or multiple hardware processors). The storage system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include snapshot creation instructions 506 to create a snapshot of a data volume (e.g., a trap volume or a production volume). The snapshot can be a read-only snapshot of the data volume. The machine-readable instructions may also create a read-write snapshot of the data volume in examples where the read-write snapshot is used.

The machine-readable instructions in the storage medium 504 include write request reception instructions 508 to receive, at the storage system, write requests having a specified characteristic from a host system, the write requests to write data of the data volume (e.g., write data to the data volume or to a read-write snapshot of the data volume). The storage system is to reject the write requests having the specified characteristic and to accept write requests without the specified characteristic.

The machine-readable instructions in the storage medium 504 include tracking metadata maintenance instructions 510 to maintain metadata for the snapshot of the data volume. The metadata indicates blocks of the data volume that have changed since the snapshot of the data volume was created.

The machine-readable instructions in the storage medium 504 include unauthorized data encryption determination instructions 512 to determine, using the metadata, whether an unauthorized data encryption of data of the data volume has occurred.

Figure 6:
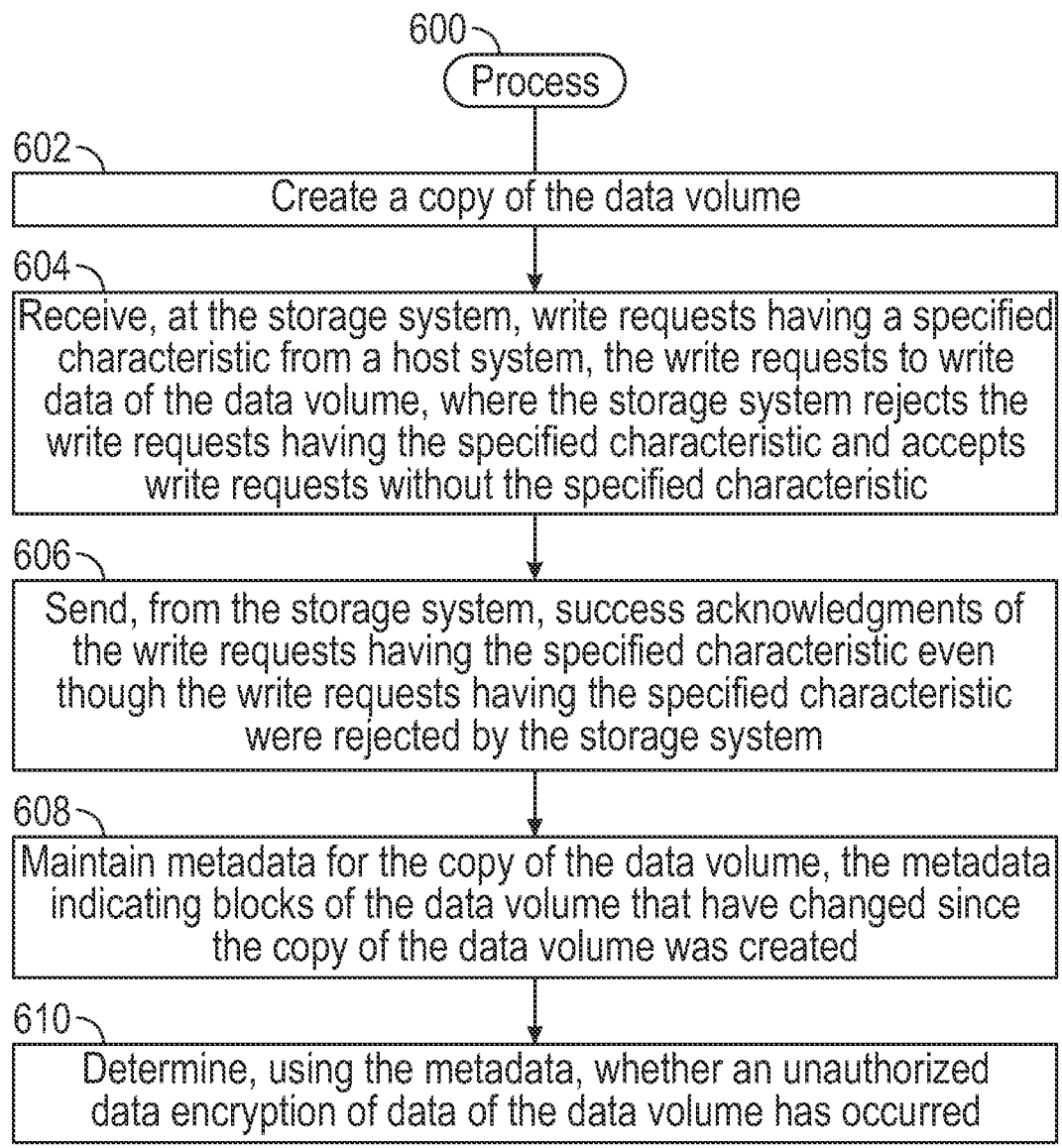
FIG. 6 is a flow diagram of a process according to some examples.

FIG. 6 is a flow diagram of a process 600 according to some examples, which can be performed by a storage system such as the storage system 104 of FIG. 1.

The process 600 includes creating (at 602) a copy of a data volume (e.g., a trap volume or a production volume). The copy can be a read-only snapshot of the data volume. The process may also create a read-write snapshot of the data volume in examples where the read-write snapshot is used.

The process 600 includes receiving (at 604), at the storage system, write requests having a specified characteristic from a host system, the write requests to write data of the data volume. The write requests can write data to the data volume, or to a read-write snapshot of the data volume. The storage system rejects the write requests having the specified characteristic and accepts write requests without the specified characteristic.

The process 600 includes sending (at 606), from the storage system, success acknowledgments of the write requests having the specified characteristic even though the write requests having the specified characteristic were rejected by the storage system.

The process 600 includes maintaining (at 608) metadata for the copy of the trap volume. The metadata indicates blocks of the data volume that have changed since the copy of the data volume was created.

The process 600 includes determining (at 610), using the metadata, whether an unauthorized data encryption of data of the trap volume has occurred.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); a tape medium; or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a storage system to:
create a first copy of a data volume;
receive, at the storage system, write requests having a specified characteristic from a host system, the write requests to write data of the data volume, wherein the storage system is to reject the write requests having the specified characteristic and to accept write requests without the specified characteristic;

send, to the host system, success acknowledgments of the write requests having the specified characteristic even though the write requests having the specified characteristic were rejected by the storage system;

maintain metadata for the first copy of the data volume, the metadata indicating blocks of the data volume that have changed since the first copy of the data volume was created; and determine, using the metadata, whether an unauthorized data encryption of data of the data volume has occurred.

2. The non-transitory machine-readable storage medium of claim 1, wherein the first copy of the data volume comprises a read-only snapshot of the data volume, and the write requests having the specified characteristic are to a read-write snapshot of the data volume.

3. The non-transitory machine-readable storage medium of claim 2, wherein the metadata comprises first metadata for the read-only snapshot, and the instructions upon execution cause the storage system to:

maintain second metadata for the read-write snapshot; and determine whether the unauthorized data encryption has occurred based on comparing the first metadata and the second metadata.

4. The non-transitory machine-readable storage medium of claim 3, wherein the instructions upon execution cause the storage system to:

determine that the unauthorized data encryption has occurred in response to detecting that the first metadata does not match the second metadata.

5. The non-transitory machine-readable storage medium of claim 4, wherein the first metadata comprises a first bitmap including bits indicating whether respective blocks of the data volume have changed since the read-only snapshot of the data volume was created, and the second metadata comprises a second bitmap including bits indicating whether respective blocks of the read-write snapshot have changed relative to the data volume.

6. The non-transitory machine-readable storage medium of claim 1, wherein the first copy of the data volume is a read-only snapshot of the data volume, and the write requests having the specified characteristic are to the data volume.

7. The non-transitory machine-readable storage medium of claim 6, wherein the instructions upon execution cause the storage system to:

determine whether the unauthorized data encryption has occurred based on detecting whether the metadata for the read-only snapshot has changed.

8. The non-transitory machine-readable storage medium of claim 7, wherein the metadata comprises a bitmap including bits indicating whether respective blocks of the data volume have changed since the read-only snapshot of the data volume was created, and the instructions upon execution cause the storage system to:

determine that the unauthorized data encryption has occurred in response to detecting that the bitmap has changed.

9. The non-transitory machine-readable storage medium of claim 1, wherein the write requests having the specified characteristic comprise write requests from a specified requester.

10. The non-transitory machine-readable storage medium of claim 1, wherein the write requests having the specified characteristic comprise write requests to write data having a specified pattern.

11. The non-transitory machine-readable storage medium of claim 1, wherein the write requests having the specified characteristic comprise write requests to a specified target storage location.

12. A storage system comprising:
a processor; and
a non-transitory storage medium storing instructions executable on the processor to:
create a snapshot of a data volume;
receive, at the storage system, write requests having a specified characteristic from a host system, the write requests to write data of the data volume, wherein the storage system is to reject the write requests having the specified characteristic and to accept write requests without the specified characteristic;
send success acknowledgments of the write requests having the specified characteristic even though the write requests having the specified characteristic were rejected by the storage system;
maintain metadata for the snapshot of the data volume, the metadata indicating blocks of the data volume that have changed since the snapshot of the data volume was created; and
determine, using the metadata, whether an unauthorized data encryption of data of the data volume has occurred.

13. The storage system of claim 12, wherein the snapshot is a read-only snapshot.

14. The storage system of claim 13, wherein the instructions are executable on the processor to:

create a read-write snapshot of the data volume,
wherein the write requests having the specified characteristic are to the read-write snapshot of the data volume.

15. The storage system of claim 14, wherein the metadata is a first tracking metadata for the read-only snapshot, the first tracking metadata containing indicators of whether data blocks of the data volume have changed, and wherein the instructions are executable on the processor to:

maintain a second tracking metadata for the read-write snapshot, the second tracking metadata containing indicators of whether data blocks of the read-write snapshot have changed, wherein the determining of whether the unauthorized data encryption of the data of the data volume has occurred is based on comparing the first tracking metadata to the second tracking metadata.

16. The storage system of claim 13, wherein the write requests having the specified characteristic are to the data volume, and wherein the metadata is a tracking metadata for the read-only snapshot, the tracking metadata containing indicators of whether data blocks of the data volume have changed, and wherein the determining of whether the unauthorized data encryption of the data of the data volume has occurred is based on detecting a change in the tracking metadata.

17. A method of a storage system comprising a hardware processor, comprising:
creating a copy of a data volume;
receiving, at the storage system, write requests having a specified characteristic from a host system, the write requests to write data of the data volume, wherein the storage system is to reject the write requests having the specified characteristic and to accept write requests without the specified characteristic;

sending, by the storage system, success acknowledgments of the write requests having the specified characteristic even though the write requests having the specified characteristic were rejected by the storage system;

maintaining metadata for the copy of the data volume, the metadata indicating blocks of the data volume that have changed since the copy of the data volume was created; and determining, using the metadata, whether an unauthorized data encryption of the data of the data volume has occurred.

18. The method of claim 17, wherein the write requests having the specified characteristic are to the data volume or to a read-write snapshot of the data volume.

* * * * *